United States Patent [19]

Makino

[11] Patent Number: 5,657,260
[45] Date of Patent: Aug. 12, 1997

[54] PRIORITY DETECTING COUNTER DEVICE

[75] Inventor: Hiroshi Makino, Itami, Japan

[73] Assignee: Mitsubishi Denki Kabushiki Kaisha, Tokyo, Japan

[21] Appl. No.: 533,552

[22] Filed: Sep. 25, 1995

[30] Foreign Application Priority Data

Nov. 17, 1994 [JP] Japan .................. 6-283697

[51] Int. Cl.⁶ .................................................. G06F 7/00
[52] U.S. Cl. .................. 364/715.1; 364/715.04
[58] Field of Search ..................... 364/715.1, 715.04

[56] References Cited

U.S. PATENT DOCUMENTS

| | | | |
|---|---|---|---|
| 4,064,421 | 12/1977 | Gajski et al. | 364/715.1 |
| 4,773,033 | 9/1988 | Ikumi | 364/715.1 |
| 4,785,421 | 11/1988 | Takahashi et al. | 364/715.04 |
| 5,111,415 | 5/1992 | Shackleford | 364/715.04 |
| 5,345,405 | 9/1994 | Walsh et al. | 364/715.1 |
| 5,383,142 | 1/1995 | Chung | 364/715.1 |
| 5,568,410 | 10/1996 | Béchade | 364/715.1 |
| 5,576,982 | 11/1996 | Wu et al. | 364/715.1 |

FOREIGN PATENT DOCUMENTS 5-303485  11/1993  Japan .

*Primary Examiner*—David H. Malzahn
*Attorney, Agent, or Firm*—Oblon, Spivak, McClelland, Maier & Neustadt, P.C.

[57] ABSTRACT

It is an object to measure the number of "zeros" standing from the head of an input bit string at a very high speed. A bit string D15–D0 of 16 bits is sequentially inputted to first blocks B7–B0 by each 2 bits. An AND circuit 1 and an OR circuit 2 in the first block detect that the bit string attains "01", "00", respectively. A first multiplexer circuit 9 in each second block B13–B10 selectively recognizes "01", "01" of the bit string, an AND circuit 7 detects that all of one of inputs are "0" and the others are not all "0", and an OR circuit 8 detects that all are "0", respectively. The respective parts function similarly. As a result, the signal E0–E5 is outputted as a 5-bit data signal indicating the number of "zeros" standing from the head of the input bit string in the binary notation.

9 Claims, 9 Drawing Sheets

PRIORITY DETECTING COUNTER DEVICE

BACKGROUND OF THE INVENTION

1. Field of the Invention

The present invention relates to a priority detecting counter device for counting the number of "0's" or "1's" arranged from the most significant or the least significant of a binary number.

2. Description of the Background Art

In the numerical computation mainly including the scientific and technical computation, various computations with floating points are executed to increase the precision of the computations. The floating point add is one of the most frequently executed ones. Accordingly, when an attempt is made to speed up the numerical computing system using the floating point add, it is required to speed up the add.

In the add with the floating points, so-called "digit-down" occurs when signs of two operands are opposite and the values are close. Now, consider the sum of $A=1.00000101 \times 2^{111}$ and $B=-1.11111101 \times 2^{110}$ as an example. It is assumed that the mantissas and the exponents of the operands are represented by nine digits and three digits both in the binary notation, respectively. Accordingly, in order to do the coincidence of the digits of the exponents, a transformation to $A=10.0000101 \times 2^{110}$ is done, so that the add becomes as follows. $A+B=(10.0000101-1.11111101) \times 2^{110} = 0.00001101 \times 2^{110}$. Like in this example, zeros may stand in the head as a result of the add, which is called "digit-down". In this case, the number of zeros standing in the head is counted, on the basis of which the mantissa is shifted to the left and the value is subtracted from the exponent. That is to say, as five 0's stand including the unit in the head in this example, the mantissa is sifted by five digits to the left and 5 (represented as 101 in the binary notation) is subtracted from the exponent part, and then the result of the add is $1.10100000 \times 2^{001}$. Accordingly, a priority detecting counter is required to count the number of zeros standing from the head of the bit string.

FIG. 8 shows the circuit configuration of the conventional art for performing the counting. It is shown in U.S. Pat. No. 4,785,421 "NORMALIZING CIRCUIT". In the figure, the reference numeral 51P denotes a register which stores mantissa computation result data D15–D0, 52 denotes a head "1" detection circuit for detecting the first "1" from the high order in the computation result data D15–D0, 53 denotes an encoder for coding and outputting the number of "0's" standing in the head from the values of the outputs S15–S0 of the detection circuit 52, 54P denotes a shifter for sifting the computation result data D15–D0 on the basis of an output 56P (5-bit data) coded by the encoder 53, and 55P denotes an adder for subtracting the output 56P of the encoder 53 from data 57 which provides a value of the exponent part. In this example, the bit length of the data is assumed to be 16 bits, the outputs of the register 51P are represented by D15–D0 in order from the high order side and the outputs of the head "1" detection circuit 52 are represented by S15–S0 in order from the high order side.

The structure of the head "1" detection circuit 52 is shown in FIG. 9. This detection circuit 52 is composed of sixteen blocks in total which are represented by A15–A0, respectively. The block A15 includes an AND circuit 61, n-channel MOS transistors 62 and 63 and an inverter circuit 64, and other blocks A14–A1 have the same structure as that of the block A15. The n-channel MOS transistor 62 forms a transmission gate. The block A0 includes only an AND circuit 65. The operation of this circuit 52 is described in the fifth column line 32 to the sixth column line 26 in the U.S. Pat. No. 4,785,421 mentioned above, and so the description thereof is not repeated herein. With this structure, only one of the outputs S15–S0 which corresponds to an input bit which attains "1" first from the high order side attains "1", and other outputs all go "0".

Subsequently, the encoder 53 of FIG. 8 generates the 5-bit binary data 56P indicating the number of "0's" in the head, from the one of the signals S15–S0 which attains "1" first from the high order side.

The conventional "0" counting circuit having such structure as described above has a problem of low operation speed. That is to say, in the head "1" detection circuit 52 shown in FIG. 8, fifteen transmission gates 62 in total are connected in series as shown in FIG. 9 and therefore the delay in signal transmission from input of the signal D15 to output of the signal S0 is determined by a processing time of seventeen stages in all, i.e., one stage of inverter (64), fifteen stages of transmission gates and one stage of AND circuit, in the worst case. Especially, connecting a large number of transmission gates in series causes considerable deterioration in speed. Accordingly, it can be said that the conventional structure is not suitable for the high-speed operation.

Furthermore, in the conventional structure, it must further pass through the encoder (53) to count the number of headmost "zeros", so that the delay time further increases. Moreover, if the bit length of the operands increases, then the number of stages of the circuit increases in proportion to it, so that it can also be said that the conventional structure is not suitable for processing of a large number of bits.

SUMMARY OF THE INVENTION

A first aspect of the present invention is directed to a priority detecting counter device which measures the number of "zeros" or "ones" standing from the most significant of mantissa computation result data signals of $2^n$ ($n \geq 2$) bit string indicating a mantissa represented in the binary notation and outputs its measurement result as a binary data signal. According to the priority detecting counter device, the mantissa computation result data signals are inputted two by two to $2^{n-1}$ first blocks sequentially from the most significant, each of the first blocks comprises, a first detection circuit for detecting the two mantissa computation result data signals inputted to that first block going ("0", "1"), and a second detection circuit for detecting the two mantissa computation result data signals inputted to that first block going ("0", "0"), each of the $2^{n-1}$ first blocks inputting to each of $2^{n-2}$ second blocks by two for each sequentially starting from one corresponding to the most significant of the mantissa computation result data signals, and each of the second blocks comprises, a third detection circuit connected to outputs of the second detection circuits of both the first blocks which belong to that second block for detecting that all the mantissa computation result data signals inputted to the first block on the high order side are "0" and the mantissa computation result data signals inputted to the first block on the other low order side are not all "0", a fourth detection circuit connected to the outputs of the second detection circuits of both the first blocks which belong to that second block for detecting that the mantissa computation result data signals inputted to the high order side and low order side first blocks are all "0", and a first multiplexer circuit connected to outputs of the first detection circuits of both the first blocks which belong to that second block and an output of the third detection circuit, for selecting and outputting output signals of the first detection circuits in the high order side and low order side first blocks in accordance with a level of an output signal of the third detection circuit.

Preferably, according to a priority detecting counter device of a second aspect, the n is an integer of 3 or above, each of the $2^{n-2}$ second blocks forms a part of components of $2^{n-3}$ third block(s), by each two sequentially from one corresponding to the most significant of the mantissa computation result data signals, and each of the third blocks comprises, a fifth detection circuit connected to outputs of the fourth detection circuits in both the second blocks which belong to that third block, for detecting that all the mantissa computation result data signals inputted to the second block on the high order side are "0" and the mantissa computation result data signals inputted to the second block on the other low order side are not all "0", a sixth detection circuit connected to the outputs of the fourth detection circuits in both the second blocks which belong to that third block, for detecting that all the mantissa computation result data signals inputted to the high order side and low order side second blocks are "0", a second multiplexer circuit connected to outputs of the first multiplexer circuits in both the second blocks which belong to that third block and an output of the fifth detection circuit, for selecting and outputting output signals of the first multiplexer circuits in the high order side and low order side second blocks in accordance with the level of the output signal of the fifth detection circuit, and a third multiplexer circuit connected to outputs of the third detection circuits in both the second blocks which belong to that third block and the output of the fifth detection circuit, for selecting and outputting the output signals of the third detection circuits in the high order side and low order side second blocks in accordance with the level of the output signal of the fifth detection circuit.

Preferably, according to a priority detecting counter device of a third aspect, the n is an integer of 4 or more, each of the $2^{n-3}$ third blocks forms a part of components of $2^{n-4}$ fourth block(s), by each two sequentially from one corresponding to the most significant of the mantissa computation result data signals, and each of the fourth blocks comprises, a seventh detection circuit connected to outputs of the sixth detection circuits in both the third blocks which belong to that fourth block, for detecting that all the mantissa computation result data signals inputted to the third block on the high order side are "0" and the mantissa computation result data signals inputted to the third block on the other low order side are not all "0", an eighth detection circuit connected to outputs of the sixth detection circuits in both the third blocks which belong to that fourth block, for detecting that all the mantissa computation result data signals inputted to the high order side and low order side third blocks are "0", a fourth multiplexer circuit connected to outputs of the second multiplexer circuits in both the third blocks which belong to that fourth block and an output of the seventh detection circuit, for selecting and outputting output signals of the second multiplexer circuits in the high order side and low order side third blocks in accordance with a level of an output signal of the seventh detection circuit, a fifth multiplexer circuit connected to outputs of the third multiplexer circuits in both the third blocks which belong to that fourth block and the output of the seventh detection circuit, for selecting and outputting output signals of the third multiplexer circuits in the high order side and low order side third blocks in accordance with the level of the output signal of the seventh detection circuit, and a sixth multiplexer circuit connected to outputs of the fifth detection circuits in both the third blocks which belong to that fourth block and the output of the seventh detection circuit, for selecting and outputting output signals of the fifth detection circuits in the high order side and low order side third blocks in accordance with the level of the output signal of the seventh detection circuit.

Preferably, according to a priority detecting counter device of a fourth aspect, all the first, third, fifth and seventh detection circuits are AND circuits having one of their inputs as inversion inputs, and all the second, fourth, sixth and eighth detection circuits are OR circuits.

Preferably, according to the priority detecting counter device of a fifth aspect, each of the first through fourth blocks is all formed of CMOS circuitry.

Preferably, according to the priority detecting counter device of a sixth aspect, each the first through sixth multiplexer circuits comprises a transmission gate for selecting and outputting one of the inputted output signals, and the transmission gate consists of an n-channel MOS transistor and a p-channel MOS transistor.

Preferably, according to the priority detecting counter device of a seventh aspect of the present invention, each of the first through sixth multiplexer circuits comprises a transmission gate for selecting and outputting one of the inputted output signals, and the transmission gate consists of an n-channel MOS transistor.

Preferably, according to the priority detecting counter device of an eighth aspect of the present invention, each the first through sixth multiplexer circuits comprises a transmission gate for selecting and outputting one of the inputted output signals, and the transmission gate consists of a p-channel MOS transistor.

The present invention is also directed to a priority detecting counter device for measuring the number of "zeros" or "ones" standing from the most significant of mantissa computation result data signals of $2^n$ ($n \geq 2$) bit suing indicating a mantissa represented in the binary notation and outputting the measurement result as a binary data signal of (n+1) bits. According to the priority detecting counter device of the ninth aspect, the priority detecting counter device performs processings of n stages to the inputted mantissa computation result data signals and generates a binary data signal of the (n+1) bits, and the device comprises, in an i-th ($1 \leq i \leq n$) stage in the n stages of processings, $2^{n-1}$ block means to which the mantissa computation result data signals are inputted by each $2^i$ sequentially from the most significant, each of the $2^{n-i}$ block means comprising, AND circuit means for detecting that all $2^{i-1}$ of the mantissa computation result data signals from the high order side in the $2^i$ mantissa computation result data signals inputted to that block means are "0" and following other $2^{i-1}$ of the mantissa computation result data signals are not all "0" and outputting "1", OR circuit means for detecting that the $2^i$ mantissa computation result data signals inputted to that block means are all "0" to output "0", and (i−1) multiplexer circuit means controlled by output of the AND circuit means, where inputted to the j-th ($1 \leq j \leq i-2$) multiplexer circuit means in the (i−1) multiplexer circuit means are both outputs of the corresponding j-th multiplexer circuit means in the block means on the high order side and the low order side in the preceding (i−1)th stage, and inputted to the (i−1)th multiplexer circuit means are both outputs of the AND circuit means in the corresponding block means on the high order side and the low order side in the preceding (i−1)th stage, and each of the (i−1) multiplexer circuit means selectively outputs an output of the corresponding block means on the low order side in the preceding (i−1)th stage when an output signal of the AND circuit means is "1", and selectively outputs an output of the corresponding block means on the high order side in the preceding (i−1)th stage when the output signal of the AND circuit means is "0".

According to the first aspect of the present invention, the mantissa Computation result data signals of $2^n$ (n≥2) bit string are inputted to the first detection circuit and the second detection circuit in each of the first block by each two sequentially from the most significant. Each of the first detection circuit detects the inputted two mantissa computation result data signals going ("0", "1") and transmits its output to the first multiplexer circuit in the second block on the next stage. The second detection circuit detects the inputted two mantissa computation result data signals going ("0", "0") and transmits its output to ones of inputs of the third and fourth detection circuits in the second block on the next stage. In each of the second blocks, the third detection circuit receives the outputs of the respective second detection circuits in the first blocks on the high order side and the low order side and detects that all the mantissa computation result data signals inputted to the first block on the high order side are all "0" and the mantissa computation result data signals inputted to the first block on the other low order side are not all "0", and transmits its output to the first multiplexer circuit. The fourth detection circuit, receiving the outputs of the respective second detection circuits in the first blocks on the high order side and the low order side, detects that all the mantissa computation result data signals inputted to the first blocks on the high order side and the low order side are "0". Furthermore, the first multiplexer circuit selects and outputs output signals of the first detection circuits in the first blocks on the high order side and low order side in accordance with the level of the output signal of the fourth detection circuit.

The first aspect of the present invention has the effect that the number of "0" or "1" arranged from the most significant in the mantissa computation result data signal of at least 4-bit string can be measured at a very high speed.

According to the second aspect of the present invention, each of the $2^{n-3}$ third blocks includes two of second blocks, fifth and sixth detection circuits and second and third multiplexer circuits. In each of the third blocks, first, the fifth detection circuit detects that all the mantissa computation result data signals inputted to the second block on the high order side are "0" and the mantissa computation result data signals inputted to the other low order side second block are not all "0", and transmits its output signal also to the second and third multiplexer circuits. The sixth detection circuit detects that all the mantissa computation result data signals inputted to the second blocks on the high order side and the low order side are "0" and provides an output. Further, the second multiplexer circuit selects and outputs output signals of the first multiplexer circuits in the second blocks on the high order side and the low order side in accordance with the level of the output signal of the fifth detection circuit. The third multiplexer circuit also selects and outputs the output signals of the third detection circuits in the second blocks on the high order side and the low order side in accordance with the level of the output signal of the fifth detection circuit.

The second aspect of the present invention has the effect that the number of "zeros" or "ones" standing from the most significant in the mantissa computation result data signal of at least 8-bit string can be measured at a very high speed.

According to the third aspect of the present invention, each of the $2^{n-4}$ fourth blocks includes two of third blocks, seventh and eighth detection circuits and fourth, fifth and sixth multiplexer circuits. In each of the fourth blocks, first, the seventh detection circuit detects that all the mantissa computation result data signals inputted to the third block on the high order side are "0" and the mantissa computation result data signals inputted to the other low order side third block are not all "0", and transmits its output signal also to the fourth, fifth and sixth multiplexer circuits. The eighth detection circuit detects that all the mantissa computation result data signals inputted to the third blocks on the high order side and the low order side are "0" and provides an output. Further, the fourth multiplexer circuit selects and outputs output signals of the second multiplexer circuits in the third blocks on the high order side and the low order side in accordance with the level of the output signal of the seventh detection circuit. The fifth multiplexer circuit also selects and outputs the output signals of the third multiplexer circuits in the third blocks on the high order side and the low order side in accordance with the level of the output signal of the seventh detection circuit. Furthermore, the sixth multiplexer circuit selects and outputs the output signals of the fifth detection circuits in the third blocks on the high order side and the low order side in accordance with the level of the output signal of the seventh detection circuit.

The third aspect of the present invention has the effect that the number of "zeros" or "ones" standing from the most significant in the mantissa computation result data signal of at least 16-bit string can be measured at a very high speed.

The fourth aspect of the present invention has the effect that the number of "0's" or "1's" lined up from the most significant of the mantissa computation result data signal can be measured at a very high speed by using the gate circuits with simple configuration, such as the AND circuit having one of its inputs as an inversion input and the OR circuit.

The fifth aspect of the present invention has the effect that the priority detecting counter device can all be configured with general-purpose CMOS circuits. Accordingly, the device can be configured by utilizing inversion signals and the number of circuit stages can be decreased. According to the present invention, the number of "0's" or "1's" standing from the head of an input bit string can be measured at a higher speed also in this point.

According to the sixth aspect of the present invention, since each multiplexer circuit is comprised of a transmission gate formed of the n-channel MOS transistor and the p-channel MOS transistor, each multiplexer circuit can be operated at high speed, and therefore the number of "0's" or "1'" standing from the head of the input bit string can be measured at higher speed.

According to the seventh aspect or the eighth aspect of the present invention, since each multiplexer circuit is implemented with the transmission gate capable of operating at high speed formed by utilizing the MOS transistor, a priority detecting counter device capable of high speed measurement can be implemented, and it also has the effect of decreasing the number of elements of the counter device.

According to the ninth aspect of the present invention, in the i-th (1≤i≤n) stage, each part in the block means operates as follows. First, the AND circuit means detects that all $2^{i-1}$ of the mantissa computation result data signals on the high order side in the inputted $2^i$ mantissa computation result data signals are "0" and following other $2^{i-1}$ of the mantissa computation result data signals are not all "0" and outputs "1". The OR circuit means detects that the $2^i$ mantissa computation result data signals inputted to that block means are all "0" to output "0". Further, each of the (i−1) multiplexer circuit means which belong to that block means selectively outputs the output of the corresponding block means on the low order side in the preceding (i–1)th stage when an output signal of the AND circuit means is "1", and selectively outputs the output of the corresponding block means on the high order side in the preceding (i–1)th stage when the output signal of the AND circuit means is "0".

According to the ninth aspect of the present invention, a device capable of measuring the number of "zeros" or "ones" standing from the head of an input bit string at a very high speed can be obtained, and so the technique can be provided which is effective in speeding up of the floating-point arithmetic.

Accordingly, it is a main object of the present invention to provide a counter device capable of counting the number of "0's" or "1's" standing in the head of a bit string at high speed.

The present invention also has other objects of realizing the counter device by using general-purpose CMOS circuitry, increasing the speed of multiplexer circuitry used in the counter device and decreasing the number of elements.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

The first preferred embodiment of the present invention will now be described referring to FIGS. 1–4.

Figure 1:
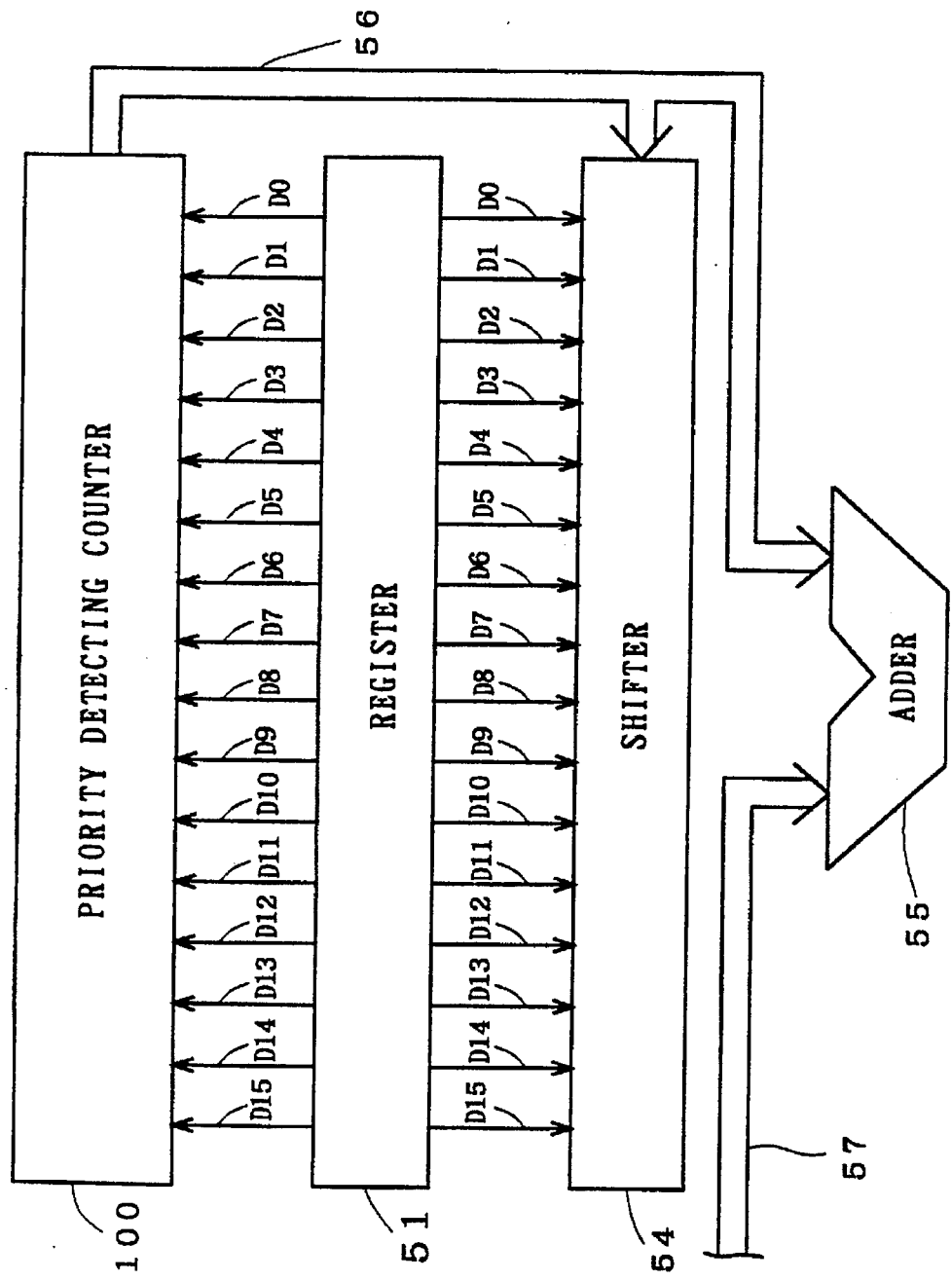
FIG. 1 is a block diagram of a circuit for modifying mantissa parts and exponent parts after digit-down to which a priority detecting counter device of the present invention is applied.

FIG. 1 shows a circuit for modifying mantissas and exponents after the digit-down which uses a priority detecting counter device 100 according to the first preferred embodiment of the present invention. In this example, the bit length of the data is assumed to be 16 bits. In this figure, a register 51 stores computation result data (expressed in the binary notation) of the mantissa when the digit-down occurs as the result of computation of two operands, and outputs the computation result data to the priority detecting counter device 100 and a shifter 54 as mantissa computation result data signals D15–D0 of 16 bits. Outputs of bits from the register 51 are represented as the signals D15 to D0 in order starting from its most significant herein. The priority detecting counter device 100 outputs a 5-bit data signal 56 which represents in binary the number of "zeros" arranged from the head of a bit string to the shifter 54 and an adder 55. The shifter 54 then shifts the mantissa computation result data signals D15–D0 on the basis of the information of the number of "0's" provided by the 5-bit data signal 56. The adder 55 subtracts the number of "0's" provided by the 5-bit data signal 56 from the value of the exponent part provided by an input exponent data signal 57.

Figure 2:
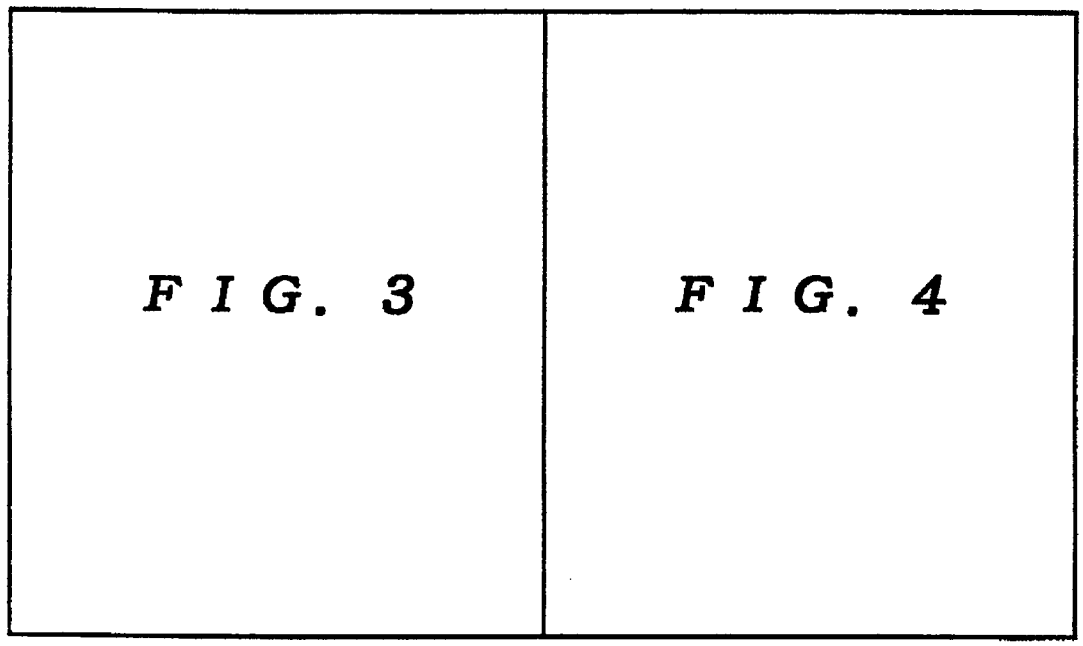
FIG. 2 is a diagram for describing that the structure of the priority detecting counter device is shown divided into two.

Next, the circuit configuration of the priority detecting counter device 100 will be described. In the illustration, as shown in FIG. 2, the configuration of the device 100 is shown divided into two parts, the part shown in FIG. 3 and the part shown in FIG. 4, for convenience.

Figure 3:
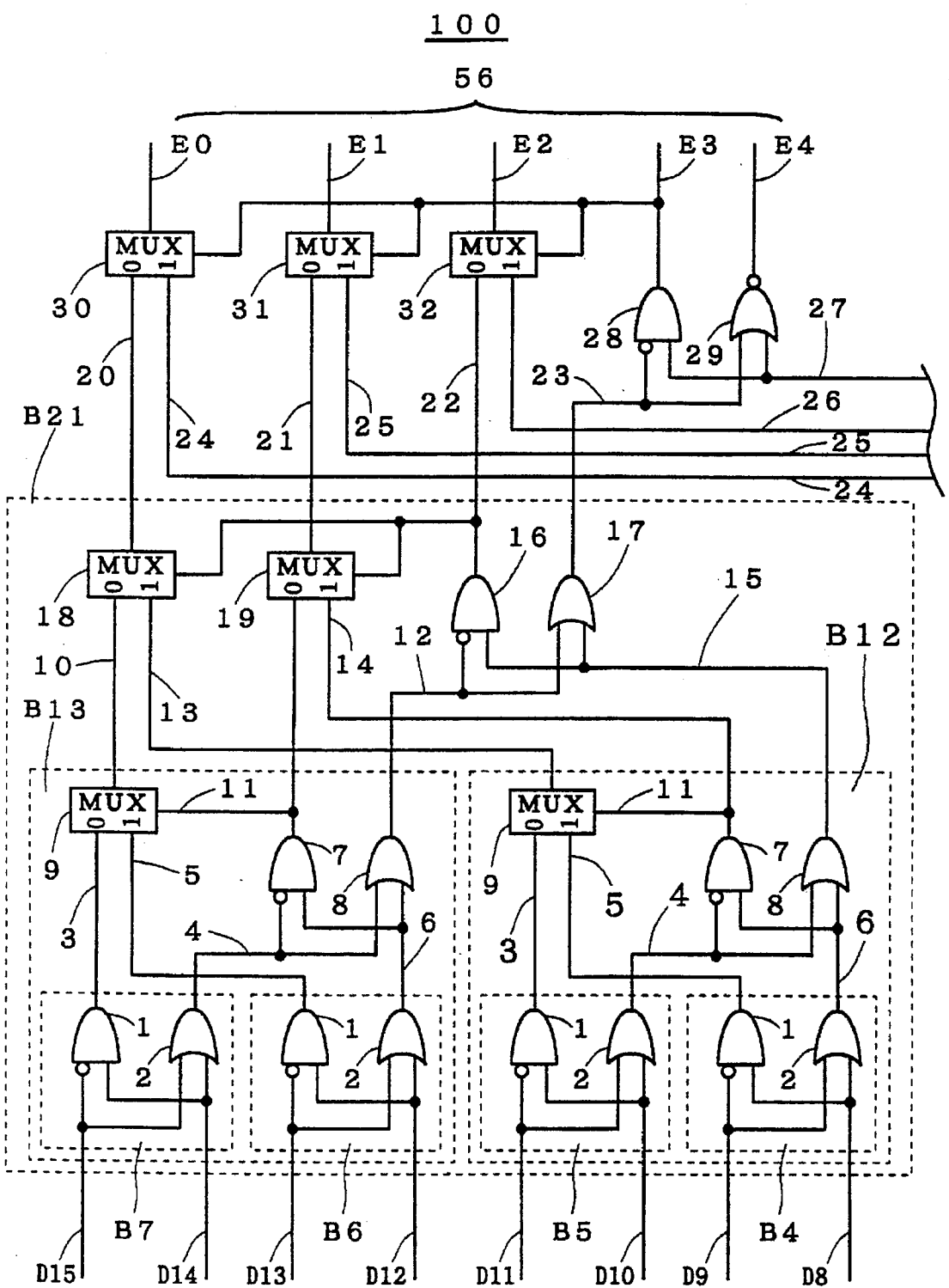
FIG. 3 is a structure diagram showing the priority detecting counter device in the first preferred embodiment.
Figure 4:
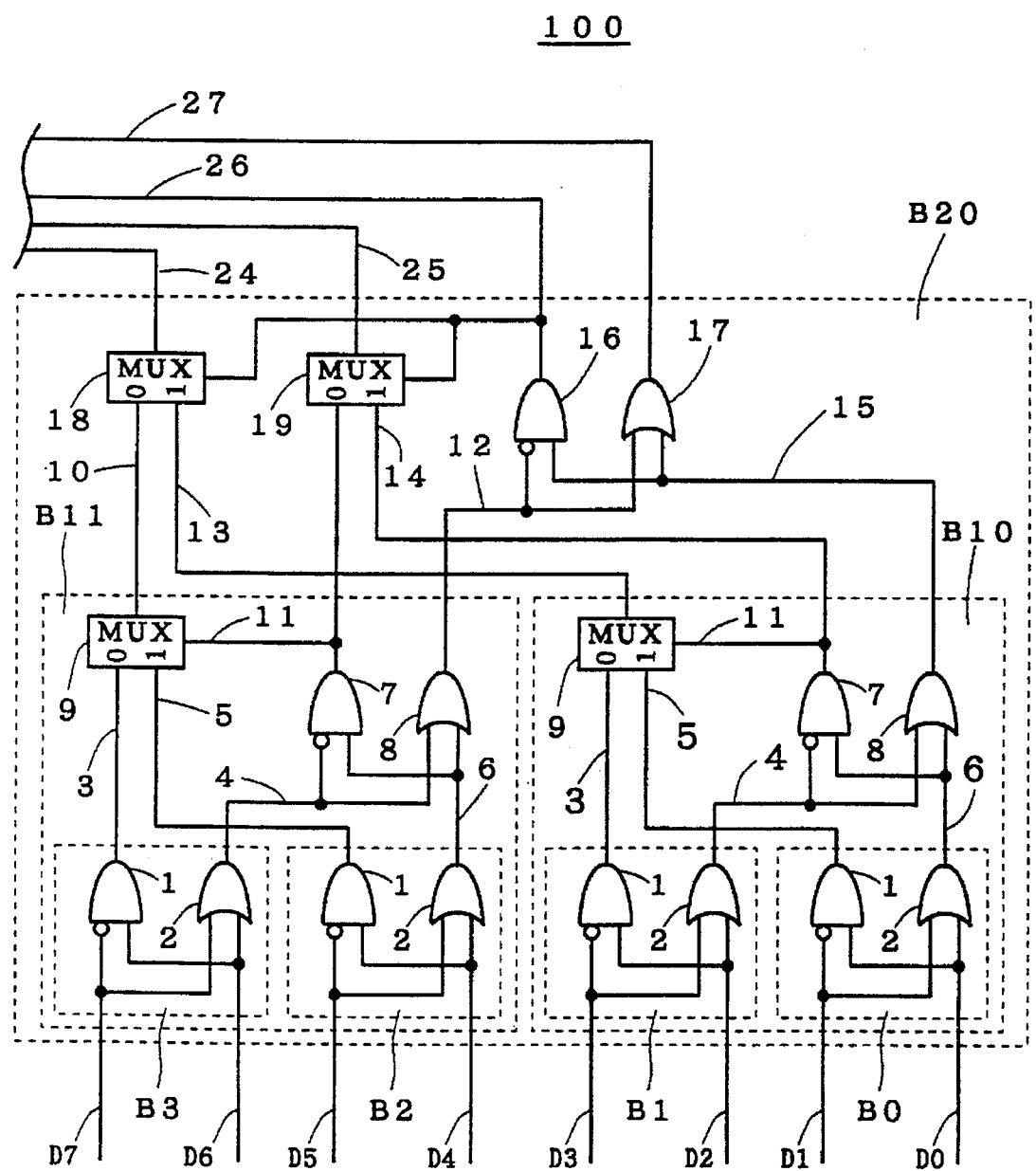
FIG. 4 is a structure diagram showing the priority detecting counter device in the first preferred embodiment.

In FIG. 3 and FIG. 4, D15–D0 denote the 16-bit mantissa computation result data signal and E0–E4 denote the 5-bit data signal which indicates in binary the number of "0's" lined up from the high-order side of the mantissa computation result data signal D15–D0. Note that the most significant data signal E4 is indicated as output of a NOR circuit 29 to represent the case where all the signals D15–D0 become "0". The data signals E0–E4 are generically represented as the 5-bit data signal 56 mentioned above. Each of first blocks B7–B0, each of second blocks B13–B10 and each of third blocks B21–B20 has the completely same configuration, respectively, which forms regular configuration as a whole. The configuration and operation will now be described for each block. The mantissa computation result data signal D15–D0 is simply called a bit string or inputs, hereinafter.

First, a description will be given on the block B7 as a representative example of first blocks. The reference numeral 1 denotes an AND circuit (or a first detection circuit) having one of its inputs as an inversion input, where the AND circuit 1 provides its output 3 being "1" only when the input D15 is "0" and the input D14 is "1" and otherwise provides its output 3 being "0". Accordingly, the output 3 attains "1" only when the combination of the two inputs D15 and D14 is "01". This represents the number of "0's" standing in the head of the bit string D15, D14.

The reference numeral 2 denotes an OR circuit (or a second detection circuit), which provides its output 4 at "0" only when both the two inputs D15 and D14 are "0" and provides its output 4 at "1" in other cases. That is to say, only when all of the bit string D15, D14 are "0", the output 4 goes "0". Other first blocks, the blocks B6–B0, have the completely same configuration and operation as the block B7.

For reference, a truth table in the block B7 is shown in Table 1 below. In Table 1, the (D15, D14) being (1, 0) or (1, 1) does not correspond to the digit-down, which is a subject to be discussed herein, therefore they are not included in the description below.

TABLE 1

| D15 | D14 | 3 | 4 |
|-----|-----|---|---|
| 0 | 0 | 0 | 0 |
| 0 | 1 | 1 | 1 |
| 1 | 0 | 0 | 1 |
| 1 | 1 | 0 | 1 |

Figure 5:
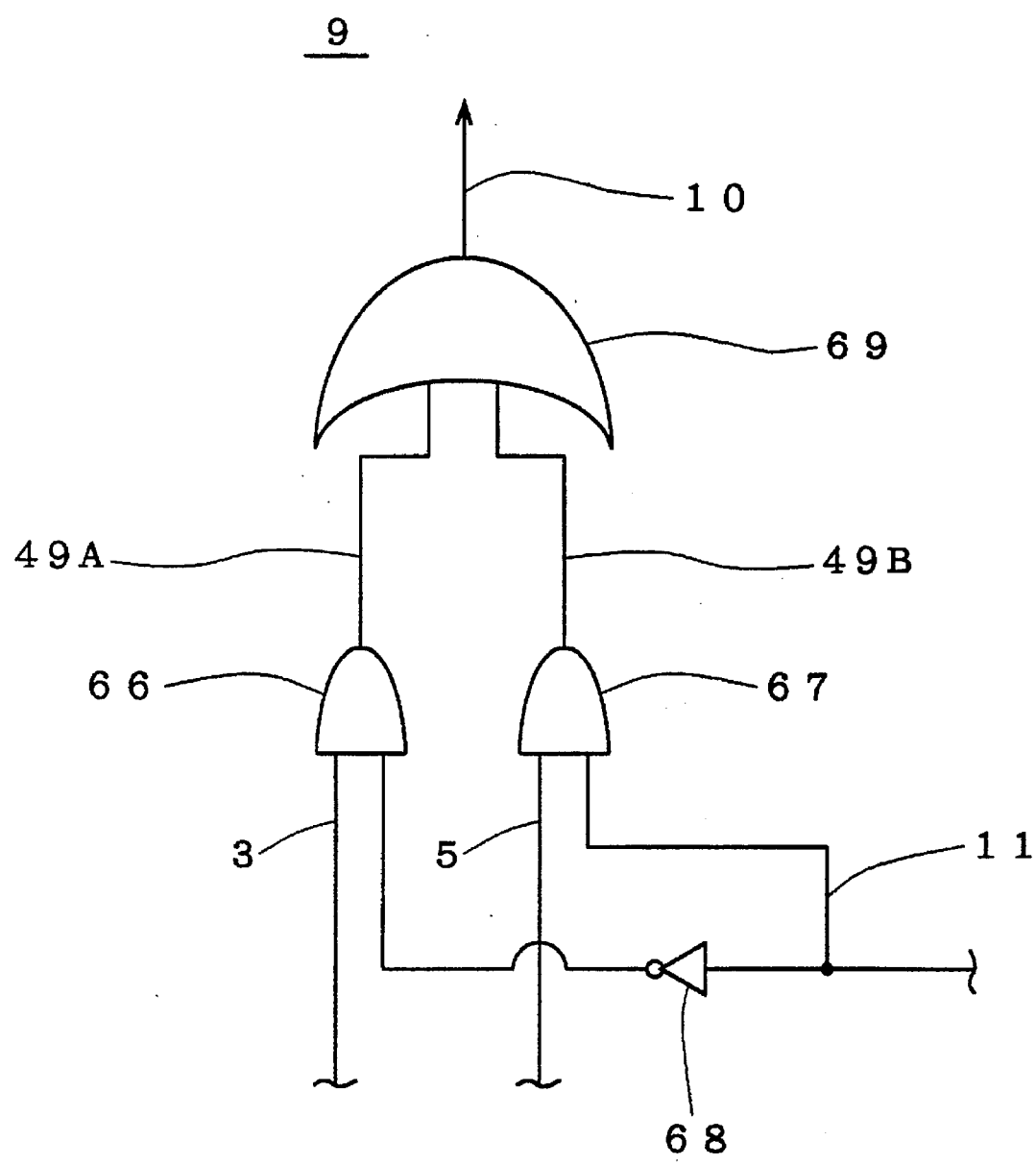
FIG. 5 is a structure diagram showing a multiplexer circuit used in the priority detecting counter device of the first preferred embodiment.

Next, the block B13 will be described as a representative example of second blocks. The block B13 includes the two blocks B7, B6, an AND circuit 7, an OR circuit 8 and a first multiplexer circuit 9. One example of the first multiplexer circuit 9 is shown in FIG. 5. The circuit 9 includes two AND circuits 66, 67, an OR circuit 69 and an inverter 68.

Similarly to the AND circuit 1, the AND circuit 7 (or a third detection circuit) has one of its inputs as an inversion input, which provides its output 11 at "1" only when the OR output 4 of the block B7 is "0" and the OR output 6 of the block B6 is "1". That is to say, the output 11 attains "1" when both the bit string D15 and D14 are "0" and one or both of the bit string D13, D12 is (are) "1", and goes "0" in other cases. At this time, the number of "0's" standing in the head of the bit string D15, D14, D13 and D12 is at least 2. Accordingly, the output 11 can be regarded as corresponding to the second bit from the least significant of "10" which represents the number of "0's" in the binary notation.

For reference, a truth table of the AND circuit 7 is shown in Table 2.

TABLE 2

| D15 | D14 | D13 | D12 | 4 | 6 | 11 | 5 | 12 |
|-----|-----|-----|-----|---|---|----|---|----|
| 0 | 0 | 0 | 0 | 0 | 0 | 0 | 0 | 0 |
| 0 | 0 | 0 | 1 | 0 | 1 | 1 | 1 | 1 |
| 0 | 0 | 1 | 0 | 0 | 1 | 1 | 0 | 1 |
| 0 | 0 | 1 | 1 | 0 | 1 | 1 | 0 | 1 |
| 0 | 1 | 0 | 0 | 1 | 0 | 0 | 0 | 1 |
| 0 | 1 | 0 | 1 | 1 | 1 | 0 | 1 | 1 |
| 0 | 1 | 1 | 0 | 1 | 1 | 0 | 0 | 1 |
| 0 | 1 | 1 | 1 | 1 | 1 | 0 | 0 | 1 |

The first multiplexer circuit 9 selects one of the signals 3 and 5 indicating the number of "0's" standing in the head of each of the blocks B7 and B6 on the basis of a value of the above-described output 11 as a selection signal. That is to say, when the output 11 is "0", the signal 3 is selected and the signal 3 is outputted as the signal 10. At this time, if the signal 3 is "1", the number of "0's" standing in the head of the bit string D15–D12 is 1. When the output 11 is "1", the signal 5 is selected and the signal 5 is outputted as the signal 10. Accordingly, the output 10 can be regarded as the least significant bit in a binary number representing the number of "0's" standing in the head of the bit string D15, D14, D13 and D12. Thus, a binary number which indicates the number of "0's" arranged in the head of the bit string D15, D14, D13 and D12 can be obtained by using the signals 10 and 11.

The OR circuit 8 (or a fourth detection circuit) is a circuit for doing the logical sum of the OK outputs 4 and 6 of the blocks B7 and B6, and it outputs "0" only when all of the bit string D15, D14, D13 and D12 are "0" as shown in Table 2. The blocks B12–B10 function in the same way as the block B13.

Next, the block B21 will be described as a representative example of third blocks in a still upper hierarchy. The block B21 includes the blocks B13 and B12, an AND circuit 16 (or a fifth detection circuit), an OR circuit 17 (or a sixth detection circuit), a second multiplexer circuit 18 and a third multiplexer circuit 19. The function of the block B21 is basically the same as the block B13. That is to say, the second multiplexer circuit 18, the third multiplexer circuit 19 and the AND circuit 16 generate a binary number representing the number of "0's" arranged in the head of the bit string D15–D8 as a 3-bit signal represented by signals 20, 21 and 22 in order starting from the least significant. The OR circuit 17 outputs a signal 23 at "0" only when all of the bit string D15–D8 are "0". Another block B20 functions in the same way as the block B21.

Furthermore, by inputting each of corresponding outputs (20, 24), (21, 25), (22, 26), (23, 27) of the blocks B21 and B20 to each of the fourth, fifth and sixth multiplexer circuits 30, 31 and 32 and the AND circuit 28 (or a seventh detection circuit), a binary number indicating the number of "0's" lined up in the head of the bit string D15–D0 formed of the entire input bits is generated as signals E0, E1, E2 and E3 in order starting from the least significant, or as the 4-bit signal E0–E3. The fourth through sixth multiplexer circuits 30, 31 and 32 all have the same function as that of the first multiplexer circuit 9.

The NOR circuit 29 outputs "1" as a signal E4 only when all the input bits are "0". That is to say, as the number of "0's" arranged in the head of the bit string D15–D0 is 16 in this case, the signal E4 can be regarded as an inversion signal indicating that "1" is provided only in the fifth bit from the least significant of a binary number representing its value.

If the block on the highest layer is represented as a fourth block, the fourth block includes the two third blocks B21, B20, the fourth through sixth multiplexer circuits 30–32, the AND circuit 28 and the NOR circuit 29.

Figure 9:
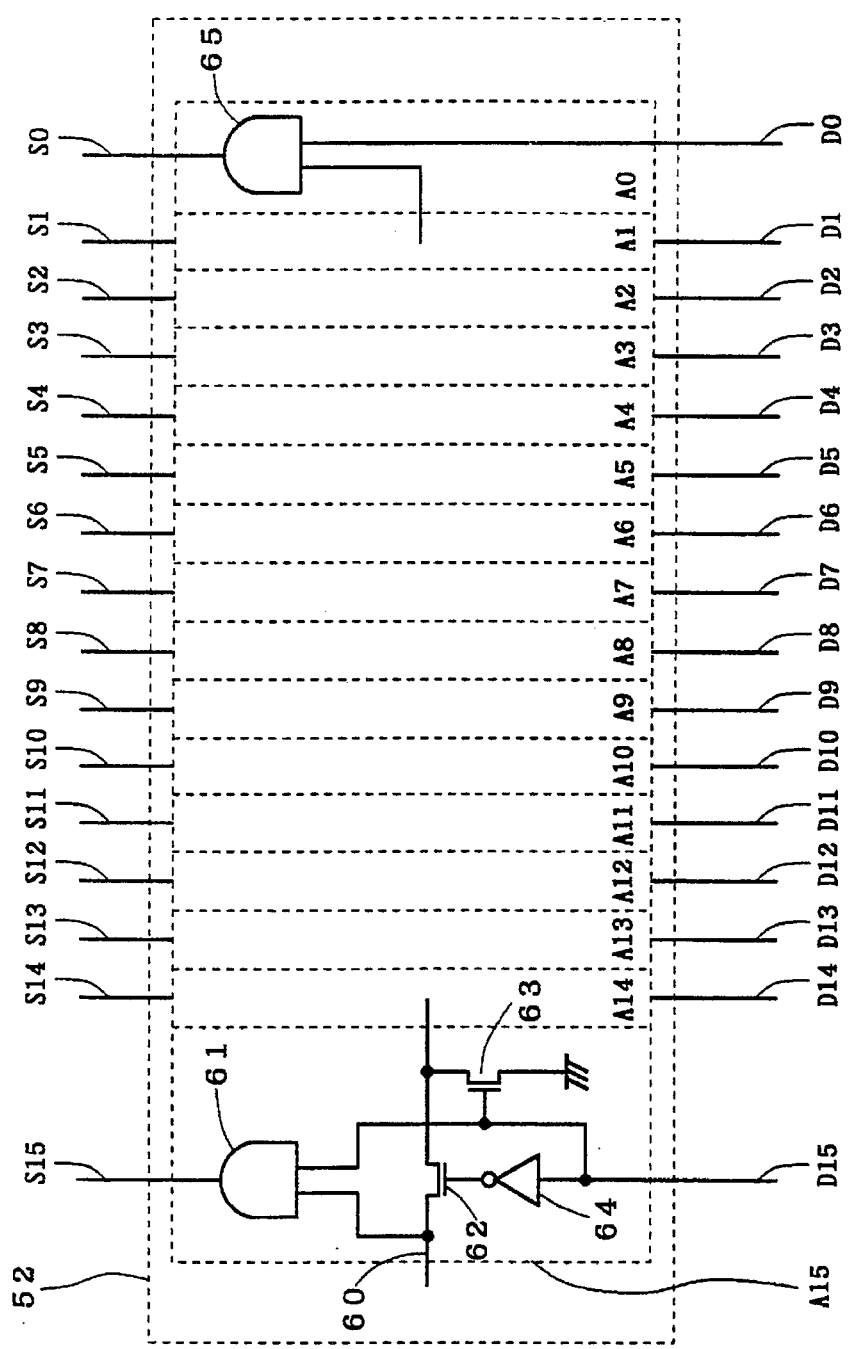
FIG. 9 is a diagram showing the conventional art.

As described above, the number of "zeros" lined up from the most significant of the inputs D15–D0 can be obtained directly in the form of a binary number as the 5-bit signal string E0–E4. In the technique of the first preferred embodiment, the delay time corresponds to a processing time of five stages of gates, therefore the headmost "zeros" can be counted at an extremely higher speed in comparison with the conventional example shown in FIG. 9.

Furthermore, the device 100 can also count the number of "1's" standing from the head of a bit string by inverting and inputting the bit string D15–D0.

Second Preferred Embodiment

Figure 6:
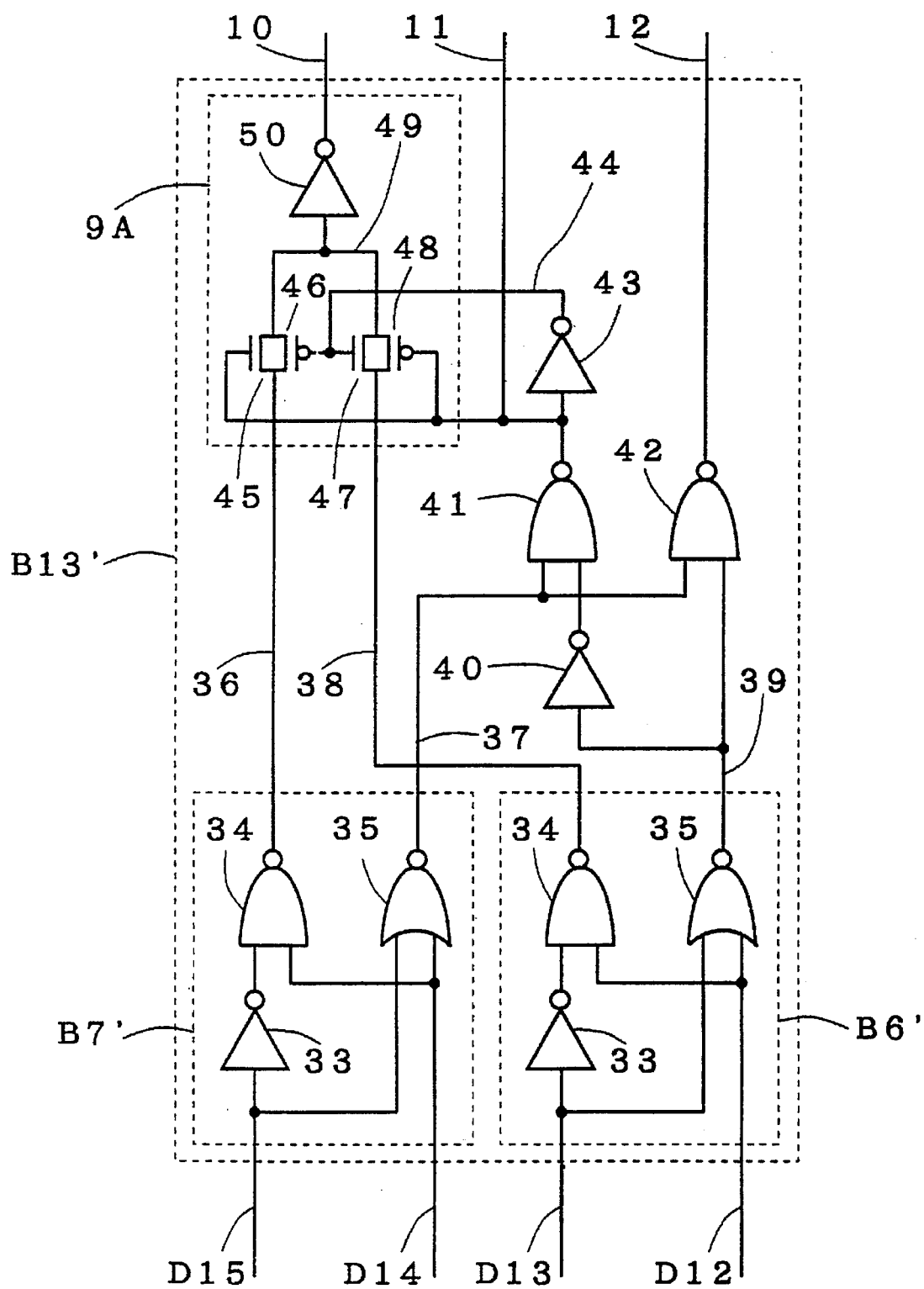
FIG. 6 is a structure diagram showing a second block in a priority detecting counter as the second preferred embodiment.

In the second preferred embodiment of the priority detecting counter device 100 (FIG. 1), all the second blocks B13–B10 shown in FIG. 3 and FIG. 4 are implemented with CMOS circuits. Now, the configuration of a new block B13' is shown in FIG. 6 as its representative example, where all of the components of the block B13 shown in FIG. 3 are implemented by using the CMOS circuits. In the figure, reference numerals 33, 40, 43 and 50 denote inverter circuits, 34, 41 and 42 denote 2-input NAND circuits, and 35 denotes a 2-input NOR circuit. The p-channel MOS'es 48 and 46, and the n-channel MOS'es 45 and 47 form a transmission gate. The structure of the block B13 itself can be the structures of the blocks B12–B10. Other parts are the same as those in the first preferred embodiment.

Blocks B7' and B6' (corresponding to the first blocks) operate in the almost same way as the blocks B7 and B6 of the first preferred embodiment, but outputs 36 and 37 in the second preferred embodiment are inversion signals of the outputs 3 and 4 in FIG. 3, respectively. This is due to the fact that the circuits 34 and 35 generate inversion signals by themselves, since ones corresponding to the AND circuit 1 and the OR circuit 2 in FIG. 3 are formed with the general-purpose CMOS circuits. Generally, NAND circuits, NOR circuits, inverters and transmission gates can be easily formed with the CMOS circuits. The second preferred embodiment pays attention to this point.

The signals 36 and 38 generated in the blocks B7' and B6' are selected and inverted by a first multiplexer circuit 9A and then outputted as a signal 10. The first multiplexer circuit 9A includes a transmission gate formed of the nMOS transistors 45 and 47 and the pMOS transistors 46 and 48, and the inverter 50, where the transmission gate selects one of the signals 36 and 38 in accordance with the levels of a complementary signal 11 (or a selection signal) and its inversion signal 44 and then outputs the selected signal as a signal 49. Furthermore, the circuit 9A inverts the signal 49 with the inverter 50 and the signal 10 thus becomes a non-inversion signal.

Now, if the signal 11 is at a High level, the signal 44, which is an inversion thereof, is at the Low level, and then the nMOS transistor 45 and the pMOS transistor 46 both turn on and the nMOS transistor 47 and the pMOS transistor 48 both turn off accordingly. Therefore, the output 36 is selected. To the contrary, when the signal 11 is at the Low level, the output 38 is selected.

Other operations are the same as those in the first preferred embodiment. In this way, the outputs 10-12 the same as those in the first preferred embodiment are obtained.

Now, other multiplexer circuits 18, 19, 30-32 have the same structure as that of the first multiplexer circuit 9A. Other AND circuits 16, 28 and the OR circuits 17, 29 are also formed of the CMOS circuits as shown in FIG. 6.

As described above, in this configuration, multi-input circuits with three or more inputs are not used because a larger number of inputs generally increase a processing time, and the blocks which include one of the multiplexer circuits at least are formed of the inverters, the 2-input NAND's, the 2-input NOR's and the transmission gate instead, which are all formed only with the CMOS circuits which operate at high speed. In addition, the number of stages of the circuit can be small because the inversion signals 36-39 are utilized, and thus a priority detecting counter device which can operate at a very high speed can be implemented.

Third Preferred Embodiment

Figure 7:
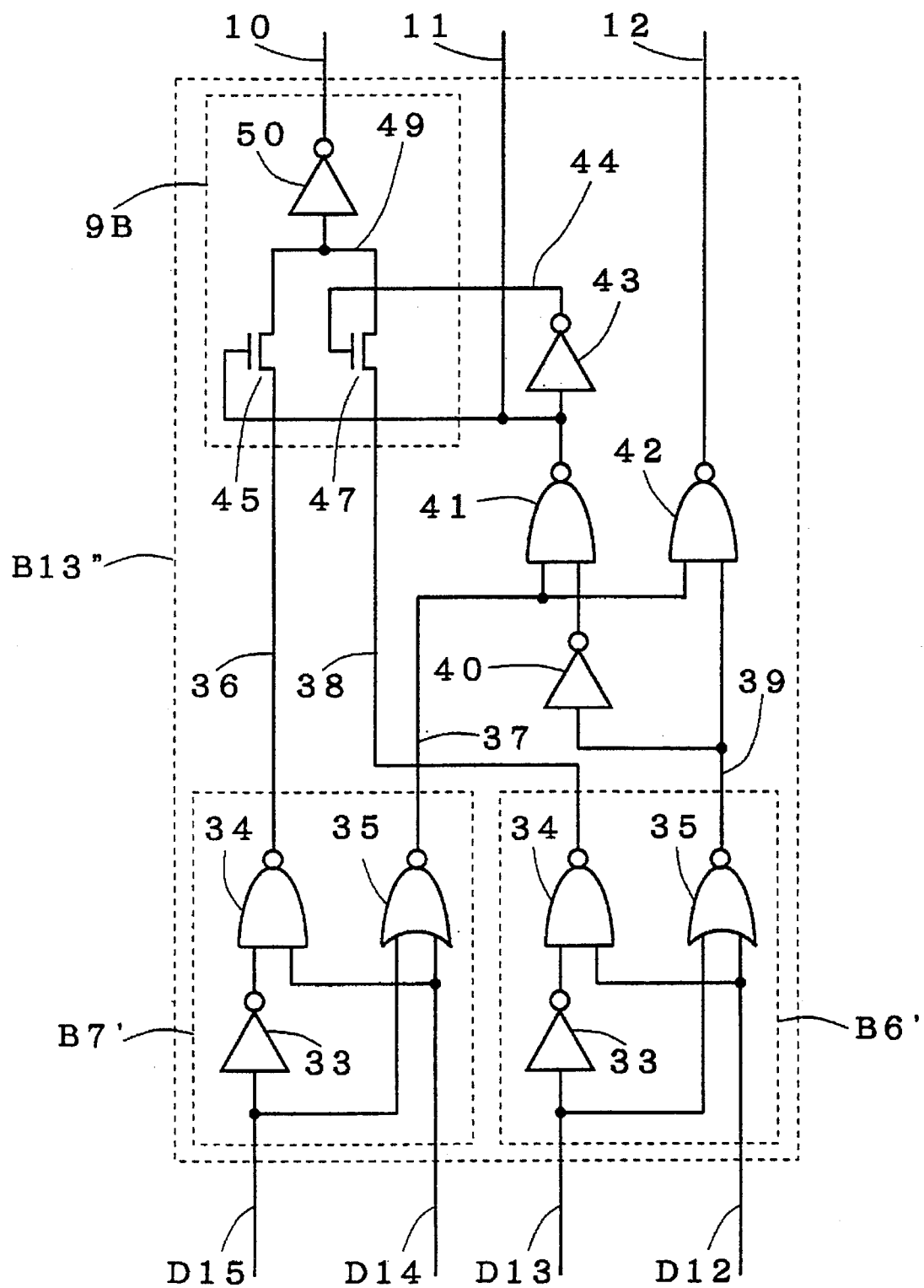
FIG. 7 is a structure diagram showing a second block in a priority detecting counter device as the third preferred embodiment.
Figure 8:
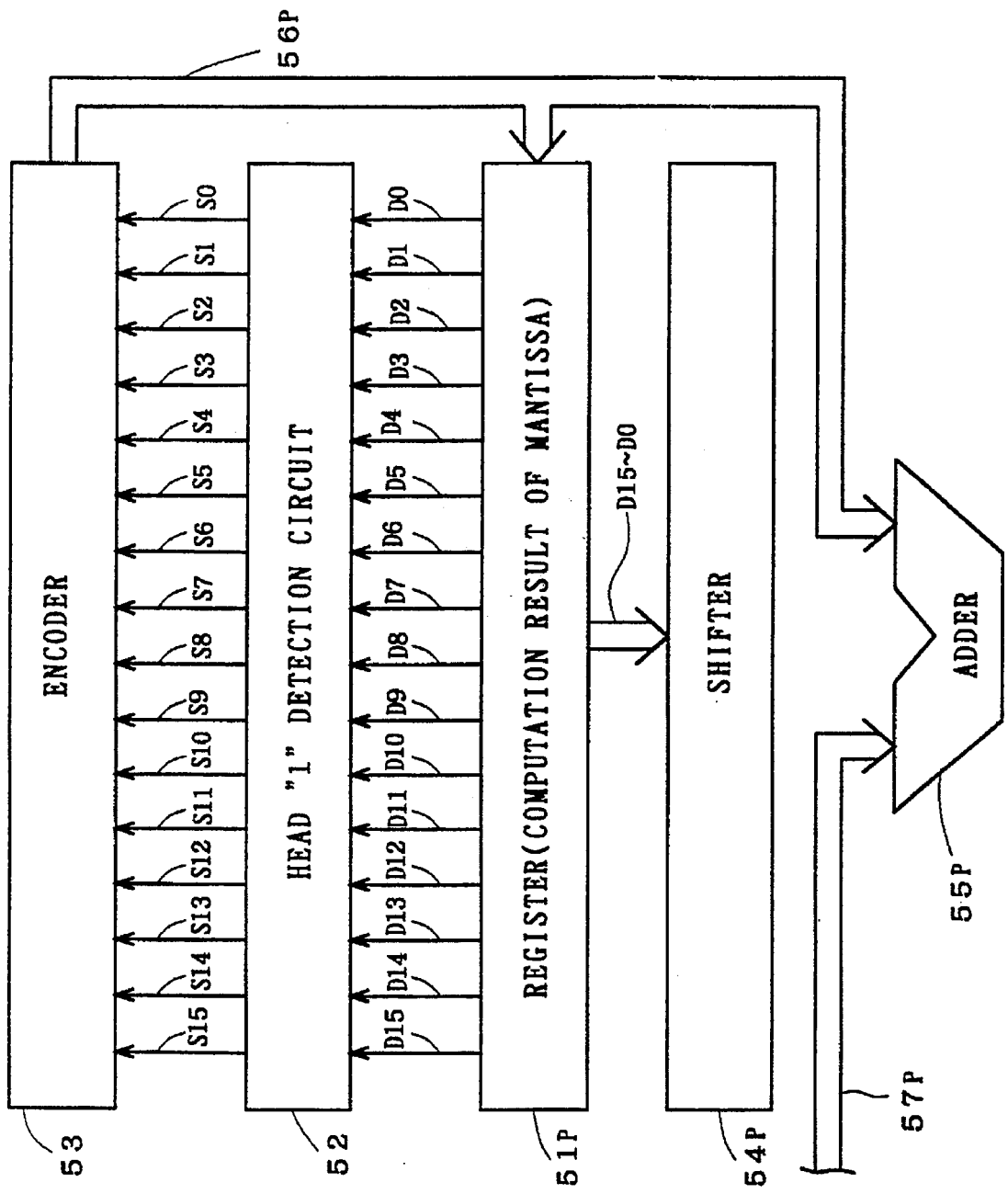
FIG. 8 is a diagram showing the conventional art.

The third preferred embodiment of the present invention also relates to a modification of the configuration of each multiplexer circuit in the priority detecting counter device 100 of the first preferred embodiment, as the second preferred embodiment described above. As a representative example of such new configuration, a first multiplexer circuit 9B is shown in FIG. 7, where the pMOS transistors 46 and 48 in the first multiplexer circuit 9A shown in FIG. 6 are removed. Configuration in other parts is the same as the first and second preferred embodiments. Accordingly, multiplexer circuits in other blocks can also be configured in the same way as shown in FIG. 7, and other circuit parts are formed of CMOS circuits.

Operation in this case is almost the same as the second preferred embodiment, but the High level of the signal 36 or the signal 38 drops by a threshold voltage of the nMOS transistor 45 or 47 to be transmitted as the output 49. Hence, the output 49 becomes narrower than the signals 36, 38 by the threshold voltage. However, in this point, malfunction can be prevented by appropriately adjusting the input threshold value of the inverter 50, and therefore the third preferred embodiment can also provide a practical counter device operating at high speed.

From the description above, the advantage of this configuration resides in the point of implementation of a priority detecting counter device with a less number of elements than the second preferred embodiment.

Although the transmission gate is formed only of the n-channel MOS transistors in the third preferred embodiment, the transmission gate may be formed only of the p-channel MOS transistors 46 and 48.

Although the description has been made on the case of data length of 16 bits in the first through third preferred embodiments, the present invention can also be applied to the cases of various bit lengths of input bit strings, such as 4 bits, 8 bits, 32 bits, etc.

That is to say, the present invention can generally be applied to mantissa computation result data signals of $2^n$ bit string, with n being an integer of 2 or above. In this case, the number of first blocks is $2^{n-1}$, the number of second blocks is $2^{n-2}$, ..., and the number of stages of the blocks is n.

Then, the structure of each block on each stage is formed according to such regularity as follows. That is, sequentially from the most significant, each $2^i$ of mantissa computation result data signals are inputted to each of $2^{n-i}$ i-th blocks on the i-th ($1 \leq i \leq n$) stage. Each of the i-th blocks includes an AND circuit portion for detecting that, in the $2^i$ mantissa computation result data signals inputted to that block, the $2^{i-1}$ mantissa computation result data signals on its high-order side are all "0" and the following other $2^{i-1}$ mantissa computation result data signals are not all "0" and for outputting "1", an OR circuit portion for detecting that all the $2^i$ mantissa computation result data signals inputted to that block are "0" and for outputting "0", and (i–1) multiplexer circuit portions controlled by the output of the AND circuit portion. Inputted to the j-th ($1 \leq j \leq i-2$) multiplexer circuit portion (for example, in the second block B13 of FIG. 3, the first multiplexer circuit 9 if j=1, and in the third block B21, the second and third multiplexer circuits 18 and 19 if j=1, j=2, respectively) in the above-mentioned (i–1) multiplexer circuit portions are both outputs of the j-th multiplexer circuit portion in the corresponding blocks on the high order side and the low order side in the preceding (i–1)th stage, and inputted to the (i–1)th multiplexer circuit portion are both outputs of the AND circuit portions in the corresponding blocks on the high order side and the low order side in the preceding (i–1)th stage, where each of the (i–1) multiplexer circuit portions selectively outputs the output of the corresponding block on the low order side in the preceding (i–1)th stage when the output signal of the AND circuit portion is "1" and selectively outputs the output of the corresponding block on the high order side in the preceding (i–1)th stage when the output signal of the AND circuit portion is "0".

As described above, according to the first through third preferred embodiments, a counter device can be obtained which counts "zeros" standing from the head of an input bit string at a very high speed.

While the invention has been described in detail the foregoing description is in all aspects illustrative and not restrictive. It is understood that numerous other modifications and variations can be devised without departing from the scope of the invention.

I claim:

1. A priority detecting counter device which measures the number of "0's" or "1's" standing from the most significant of mantissa computation result data signals of $2^n$ ($n \geq 2$) bit string indicating a mantissa represented in the binary notation and outputs its measured result as a binary data signal, wherein said mantissa computation result data signals are inputted to $2^{n-1}$ first blocks sequentially from said most significant by two for each, each of said first blocks comprising,
  a first detection circuit for detecting said two mantissa computation result data signals inputted to that first block going ("0", "1"), and
  a second detection circuit for detecting said two mantissa computation result data signals inputted to that first block going ("0", "0"),
each of said $2^{n-1}$ first blocks inputting to each of $2^{n-2}$ second blocks by two for each sequentially starting from one corresponding to said most significant of said mantissa computation result data signal, and
each said second block comprising,
  a third detection circuit connected to outputs of said second detection circuits of both said first blocks which belong to that second block for detecting that all said mantissa computation result data signals inputted to said first block on the high order side are "0" and said mantissa computation result data signals inputted to said first block on the other low order side are not all "0",
  a fourth detection circuit connected to the outputs of said second detection circuits of both said first blocks which belong to that second block for detecting that both said mantissa computation result data signals inputted to said high order side and low order side first blocks are all "0", and
  a first multiplexer circuit connected to outputs of said first detection circuits of both said first blocks which belong to that second block and to an output of said third detection circuit, for selecting and outputting output signals of said first detection circuits in said high order side and low order side first blocks in accordance with a level of an output signal of said third detection circuit.

2. The priority detecting counter device according to claim 1, wherein
said n is an integer of 3 or above, and
each of said $2^{n-2}$ second blocks forms a part of components of $2^{n-3}$ third block(s) by each two sequentially from the one corresponding to said most significant of said mantissa computation result data signals, and
each of said third block(s) comprising,
  a fifth detection circuit connected to outputs of said fourth detection circuits in both said second blocks which belong to that third block, for detecting that all said mantissa computation result data signals inputted to said second block on the high order side are "0" and said mantissa computation result data signals inputted to said second block on the other low order side are not all "0",
  a sixth detection circuit connected to the outputs of said fourth detection circuits in both said second blocks which belong to that third block, for detecting that all said mantissa computation result data signals inputted to said high order side and low order side second blocks are "0",
  a second multiplexer circuit connected to outputs of said first multiplexer circuits in both said second blocks which belong to that third block and an output of said fifth detection circuit, for selecting and outputting output signals of said first multiplexer circuits in said high order side and low order side second blocks in accordance with a level of an output signal of said fifth detection circuit, and
  a third multiplexer circuit connected to outputs of said third detection circuits in both said second blocks which belong to that third block and said output of said fifth detection circuit, for selecting and outputting output signals of said third detection circuits in said high order side and low order side second blocks in accordance with said level of said output signal of said fifth detection circuit.

3. The priority detecting counter device according to claim 2, wherein
said n is an integer of 4 or more, and
each of said $2^{n-3}$ third blocks forms a part of components of $2^{n-4}$ fourth block(s) by each two sequentially from the one corresponding to said most significant of said mantissa computation result data signals, and
each of said fourth block(s) comprising,
  a seventh detection circuit connected to outputs of said sixth detection circuits in both said third blocks which belong to that fourth block, for detecting that all said mantissa computation result data signals inputted to said third block on the high order side are "0" and said mantissa computation result data signals inputted to said third block on the other low order side are not all "0",
  an eighth detection circuit connected to the outputs of said sixth detection circuits in both said third blocks which belong to that fourth block, for detecting that all said mantissa computation result data signals inputted to said high order side and low order side third blocks are "0",
  a fourth multiplexer circuit connected to outputs of said second multiplexer circuits in both said third blocks which belong to that fourth block and an output of said seventh detection circuit, for selecting and outputting output signals of said second multiplexer circuits in said high order side and low order side third blocks in accordance with a level of an output signal of said seventh detection circuit,
  a fifth multiplexer circuit connected to outputs of said third multiplexer circuits in both said third blocks which belong to that fourth block and said output of said seventh detection circuit, for selecting and outputting output signals of said third multiplexer circuits in said high order side and low order side third blocks in accordance with said level of said output signal of said seventh detection circuit, and
  a sixth multiplexer circuit connected to said outputs of said fifth detection circuits in both said third blocks which belong to that fourth block and said output of said seventh detection circuit, for selecting and outputting said output signals of said fifth detection circuits in said high order side and low order side third blocks in accordance with said level of said output signal of said seventh detection circuit.

4. The priority detecting counter device according to claim 3, wherein
said first, third, fifth and seventh detection circuits are AND circuits having one of their inputs as inversion inputs, and
said second, fourth, sixth and eighth detection circuits are OR circuits.

5. The priority detecting counter device according to claim 3, wherein each of said first through fourth blocks is all formed of CMOS circuitry.

6. The priority detecting counter device according to claim 3, wherein each said first through sixth multiplexer circuits comprises a transmission gate for selecting and outputting one of inputted said output signals, and said transmission gate consists of an n-channel MOS transistor and a p-channel MOS transistor.

7. The priority detecting counter device according to claim 3, wherein each said first through sixth multiplexer circuits comprises a transmission gate for selecting and outputting one of inputted said output signals, and said transmission gate consists of an n-channel MOS transistor.

8. The priority detecting counter device according to claim 3, wherein each said first through sixth multiplexer circuits comprises a transmission gate for selecting and outputting one of inputted said output signals, and said transmission gate consists of a p-channel MOS transistor.

9. A priority detecting counter device for measuring the number of "0's" or "1's" standing from the most significant of mantissa computation result data signals of $2^n$ ($n \geq 2$) bit string indicating a mantissa represented in the binary notation and outputting the measurement result as a binary data signal of (n+1) bits, wherein the priority detecting counter device applies processings in n stages to inputted said mantissa computation result data signals and generates said (n+1)-bit binary data signal, and the priority detecting counter device comprises, in an i-th ($1 \leq i \leq n$) stage in said n stages of processings, $2^{n-i}$ block means to which said mantissa computation result data signals are inputted by each $2^i$ sequentially from said most significant, each of said $2^{n-i}$ block means comprising, AND circuit means for detecting that $2^{i-1}$ of said mantissa computation result data signals from the high order side in said $2^i$ mantissa computation result data signals inputted to that block means are all "0" and following other $2^{i-1}$ of said mantissa computation result data signals are not all "0" and outputting "1", OR circuit means for detecting that said $2^i$ mantissa computation result data signals inputted to that block means are all "0" and outputting "0", and (i–1) multiplexer circuit means controlled by output of said AND circuit means, wherein inputted to a j-th ($1 \leq j \leq i-2$) multiplexer circuit means in said (i–1) multiplexer circuit means are both outputs of said j-th multiplexer circuit means in corresponding said block means on the high order side and the low order side in a preceding (i–1)th stage, and inputted to the (i–1)th multiplexer circuit means are both outputs of said AND circuit means in corresponding said block means on the high order side and the low order side in said preceding (i–1)th stage, and each of said (i–1) multiplexer circuit means selectively outputs an output of corresponding said block means on the low order side in said preceding (i–1)th stage when the output signal of said AND circuit means is "1", and selectively outputs an output of corresponding said block means on the high order side in said preceding (i–1)th stage when the output signal of said AND circuit means is "0".

* * * * *